United States Patent
Yu

(10) Patent No.: US 7,576,638 B2
(45) Date of Patent: Aug. 18, 2009

(54) AUTOMOBILE ANTI-THEFT STEERING LOCK WITH AN ALARM

(75) Inventor: Pin-Han Yu, Tainan (TW)

(73) Assignee: Yung Chan Electrical Instrument Co., Ltd., Tainan (TW)

( * ) Notice: Subject to any disclaimer, the term of this patent is extended or adjusted under 35 U.S.C. 154(b) by 282 days.

(21) Appl. No.: 11/652,575

(22) Filed: Jan. 12, 2007

(65) Prior Publication Data

US 2008/0169913 A1    Jul. 17, 2008

(51) Int. Cl.
 *B60R 25/10* (2006.01)
(52) U.S. Cl. .............................. 340/426.31; 340/426.1; 340/426.22; 340/426.24; 307/10.2
(58) Field of Classification Search ............ 340/426.31, 340/426.1, 426.22–426.26, 438, 472, 473, 340/471, 425.5; 307/10.1, 10.2; 70/209
See application file for complete search history.

(56) References Cited

U.S. PATENT DOCUMENTS

| | | | | |
|---|---|---|---|---|
| 5,128,649 A * | 7/1992 | Elmer | ................... | 340/426.31 |
| 5,598,725 A * | 2/1997 | Chang | .......................... | 70/209 |
| 5,678,434 A * | 10/1997 | Kuo et al. | ..................... | 70/209 |
| 5,755,124 A * | 5/1998 | Chang | .......................... | 70/209 |
| 6,124,783 A * | 9/2000 | Alexander | ............. | 340/426.12 |
| 6,550,297 B1 * | 4/2003 | Chen | ........................... | 70/209 |
| 6,734,788 B1 * | 5/2004 | Winner | .................... | 340/426.1 |
| 7,301,443 B2 * | 11/2007 | Yu | ........................ | 340/426.31 |
| 7,411,484 B2 * | 8/2008 | Hsieh | .................... | 340/426.31 |
| 7,434,429 B1 * | 10/2008 | Yu | .............................. | 70/209 |

* cited by examiner

*Primary Examiner*—Toan N Pham

(57) ABSTRACT

An automobile steering wheel lock with an alarm includes a lock having a lock core with a chamber containing an alarm and at least one light hole. The alarm consists of a circuit board, a battery, a buzzer and a touch switch. The circuit board capable of sending signals has a warning light and a high-density LED light. Also, a help-signaling device is installed at a conspicuous location of a car and provided with at least one lamp panel. Each lamp panel is provided with a wireless receiver for receiving signals from the alarm and formed of luminescent lamps or LED lamps to show help signals. So, should the buzzer be moved by a burglar, it would sound immediately, spontaneously activating the high-density LED light to radiate toward the driver's seat and the lamp panel lit, achieving multiple anti-theft effects.

6 Claims, 6 Drawing Sheets

AUTOMOBILE ANTI-THEFT STEERING LOCK WITH AN ALARM

BACKGROUND OF THE INVENTION

1. Field of the Invention

This invention relates to an automobile steering wheel lock with an alarm, particularly to one able to sound loudly, radiate a strong light toward the driver's seat and show help signals at a conspicuous location of a car in case of the lock illegally broken.

2. Description of the Prior Art

Commonly, as shown in FIG. 1, a conventional automobile steering lock has mainly a main body 1 that is composed of a hook 10 located underneath, a lock core 11 set above, a grip 12 located at its one end, a penetrating hole 13 cut axially at the other end for a telescopic rod 14 to move along, a hook 15 located at one end of the telescopic rod 14 and a stage of continual locking grooves 16 formed on a section of the telescopic rod. In using, first, put the steering lock on the wheel and make the hook 10 fitted with an inner edge of the wheel. Next, pull outward the telescopic rod 14 to keep with the hook 15 fitted with an inner edge of the wheel at the other side. By the time, the telescopic rod 14 is extended far enough that it is to prevent the wheel from turned around. But, if the telescopic rod 14 or the main body 1 is beaten vigorously by a burglar, a deadbolt of the lock core 11 is apt to be rebounded or broken to get unlocked. In addition, there is not a warning alarm to frighten the burglar.

SUMMARY OF THE INVENTION

The objective of this invention is to offer an automobile anti-theft steering lock with an alarm, able to sound loudly and radiate a strong light toward the driver's seat.

The main characteristics of the invention are an automobile steering lock, an alarm, a cover and a help-signaling device. The steering wheel lock is provided with a lock core that has a chamber for containing the alarm and at least one light hole. The alarm is composed of a circuit board, a battery, a buzzer and a touch switch. The circuit board possesses a warning light, a high-density LED light extending through the light holes of the chamber. The help-signaling device is placed at a conspicuous location of a car, provided with at least one lamp panel each formed in characters of HELP and provided with a wireless receiver for receiving signals from the alarm. So, as soon as the buzzer is moved by a burglar, it is to sound immediately, spontaneously activating the high-density LED light to radiate toward the driver's seat and the lamp panels lit via receiving signals from the alarm, achieving multiple anti-theft effects.

BRIEF DESCRIPTION OF DRAWINGS

This invention is better understood by referring to the accompanying drawings, wherein.

DETAILED DESCRIPTION OF THE PREFERRED EMBODIMENT

Figure 1:
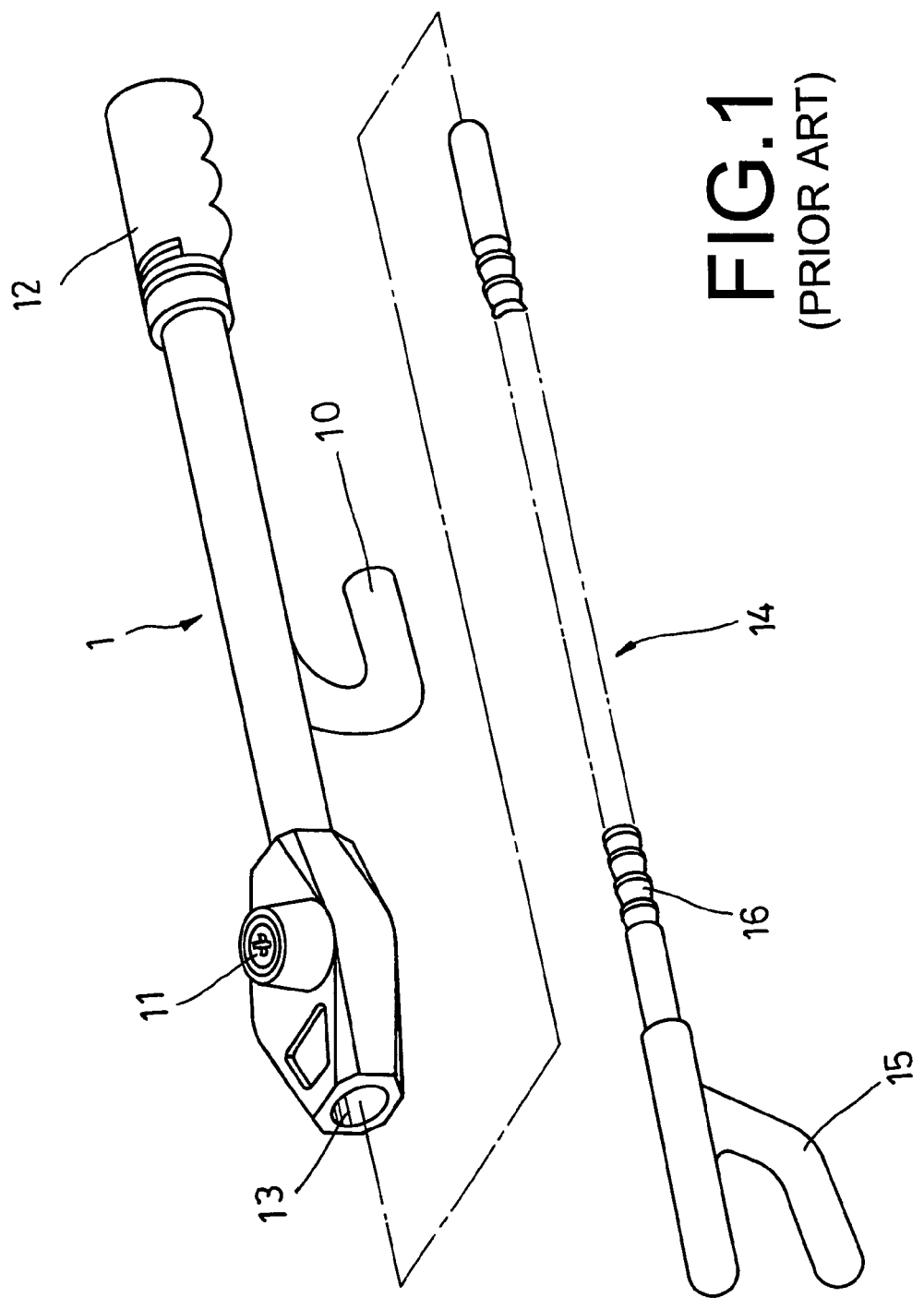
FIG. 1 is a perspective view of a conventional automobile anti-theft steering wheel lock.
Figure 2:
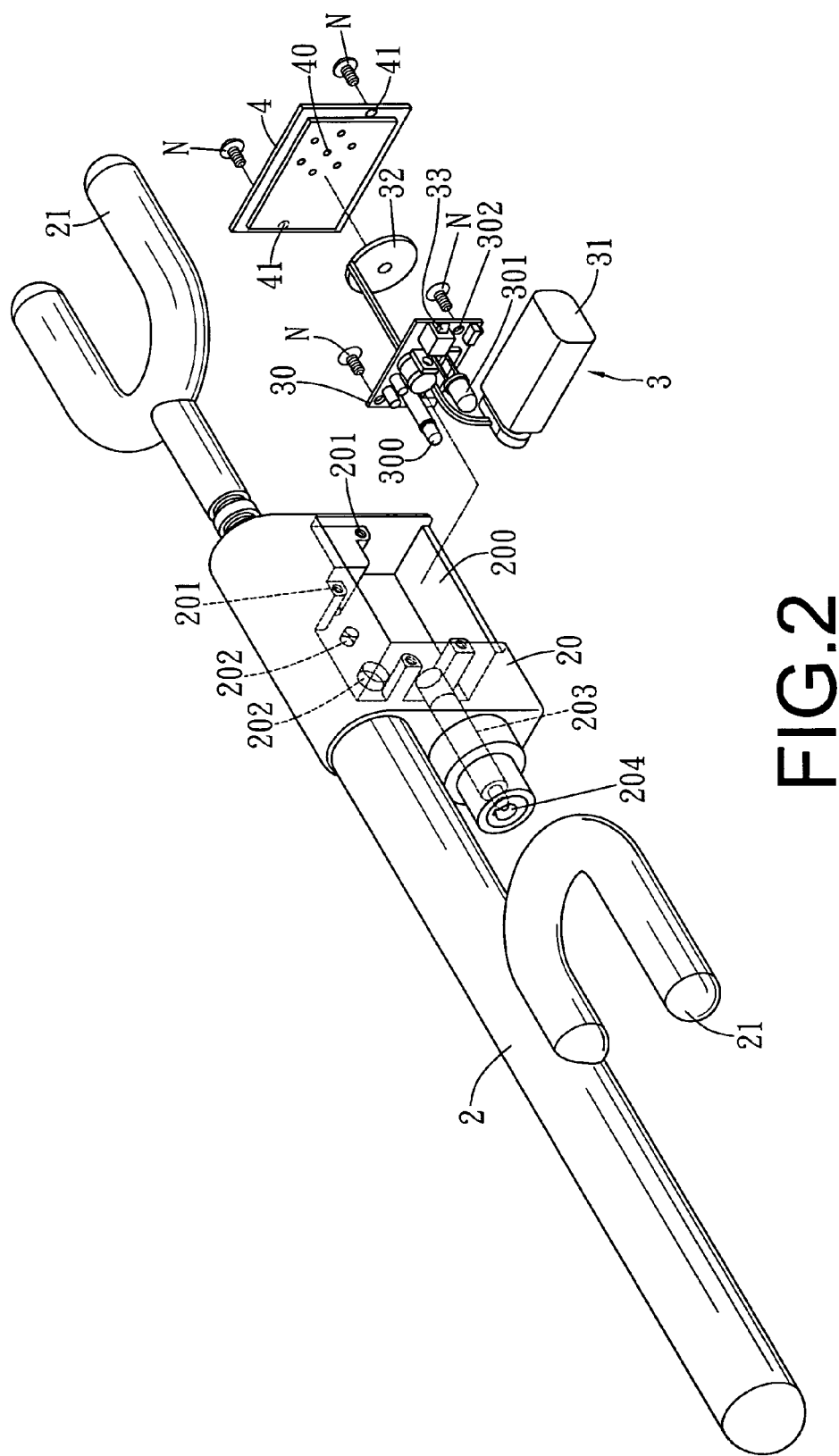
FIG. 2 is a perspective view of a preferred embodiment of an automobile anti-theft steering wheel lock with an alarm in the present invention.
Figure 3:
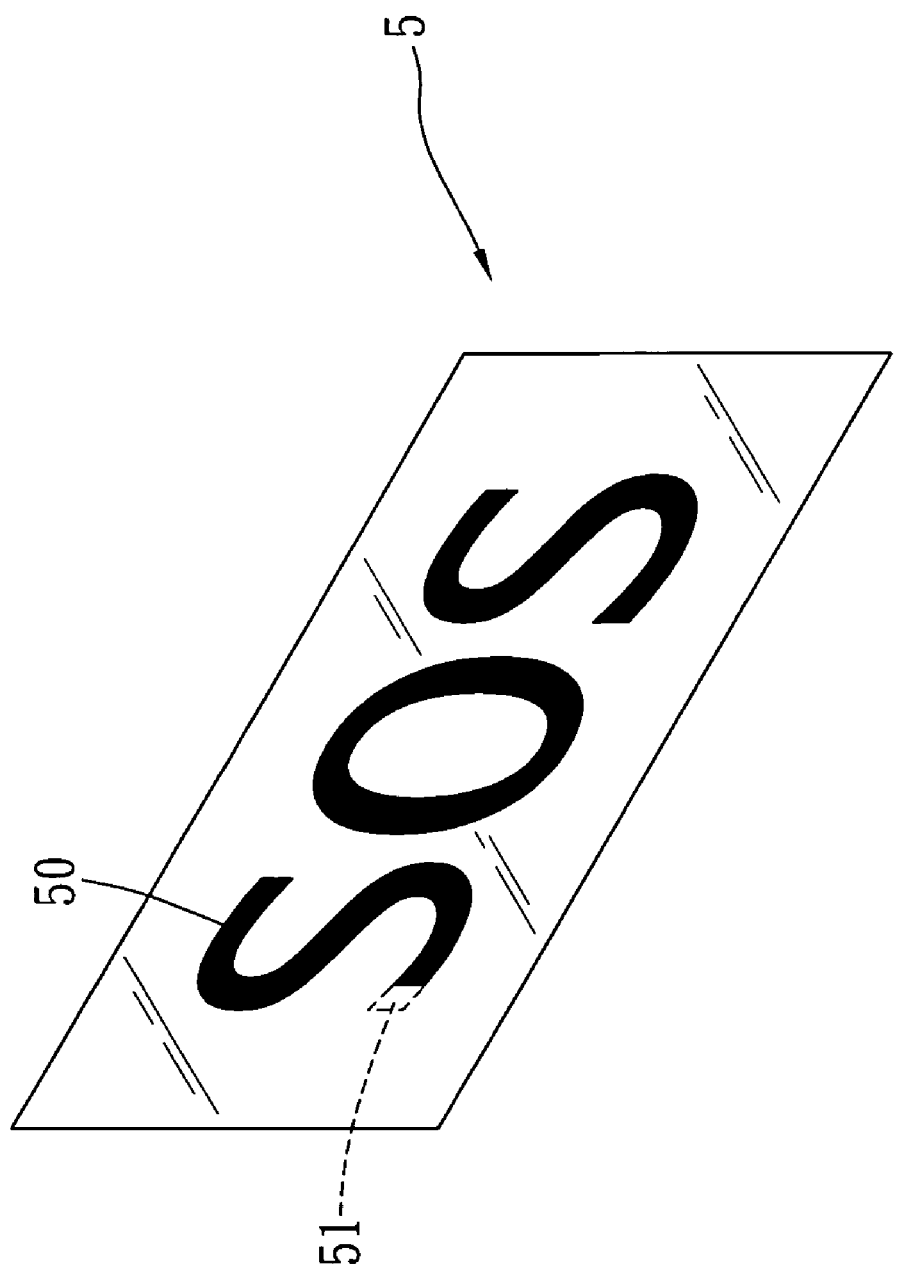
FIG. 3 is a perspective view of a help signaling device of the preferred embodiment of an automobile anti-theft steering wheel lock with an alarm in the present invention.

As shown in FIG. 2, a preferred embodiment of an automobile anti-theft steering lock with an alarm in the present invention includes a steering wheel lock 2, an alarm 3, a cover 4 and a help-signaling device 5.

The steering wheel lock 2 is provided with a lock core 20 and a hook 21 for hooking with the steering wheel. The lock core 20 is composed of a chamber 200, a screw hole 201, at least one light hole 202 dug through a wall of the chamber 200, a locking bar 203 installed in a side section and a keyway 204 opened at one end of the locking bar 203.

The alarm 3 is installed in the chamber 200 of the lock core 20, provided with a circuit board 30, a battery 31 connected with the circuit board 30, a buzzer 32 and a touch switch 33 planted on the circuit board 30. The circuit board 30 capable of sending signals consists of a warning light 300 and a high-density LED light 301 both extending through the light holes 202 of the chamber 200 and keeping their tails slightly exposed out of the light holes 202. The circuit board 30 is also provided with a screw hole 302 at its two opposite sides respectively for screws (N) to engage with the screw holes 201 of the lock core 20.

The cover 40 is sealed on the lock core 20 of the steering wheel lock 2, provided with plural buzzing holes 40 corresponding to the buzzer 302 of the alarm 3 and a screw hole 41 at its two opposite sides respectively for the screws (N) to engage with the screw holes 201 of the lock core 20 correspondingly.

The help-signaling device 5 installed at a conspicuous location of a car is provided with at least one lamp panel 50. Each lamp panel 50 is formed of electro luminescent lamps or LED lamps in characters such as SOS or HELP and provided with a wireless receiver 51 for receiving wireless signals sent by the alarm 3.

In assembly, as shown in FIGS. 2, 3, 4 and 6, the alarm 3 is first installed in the chamber 200 of the lock core 20 of the steering wheel lock 2, keeping the warning light 300 and the high-density LED light 301 of the alarm 3 facing exactly to the light holes 202. Next, the screws (N) are fastened to keep the alarm 3 positioned. The cover 4 is successively fitted to enable the screw holes 41 to correspondingly face to the other screw holes 201 of the lock core 20 and then, the screw N is as well fastened to keep the cover 4 positioned. In addition, put the lamp panels 50 of the help-signaling device 5 at a conspicuous location of a car, such as windows or body surface.

Figure 4:
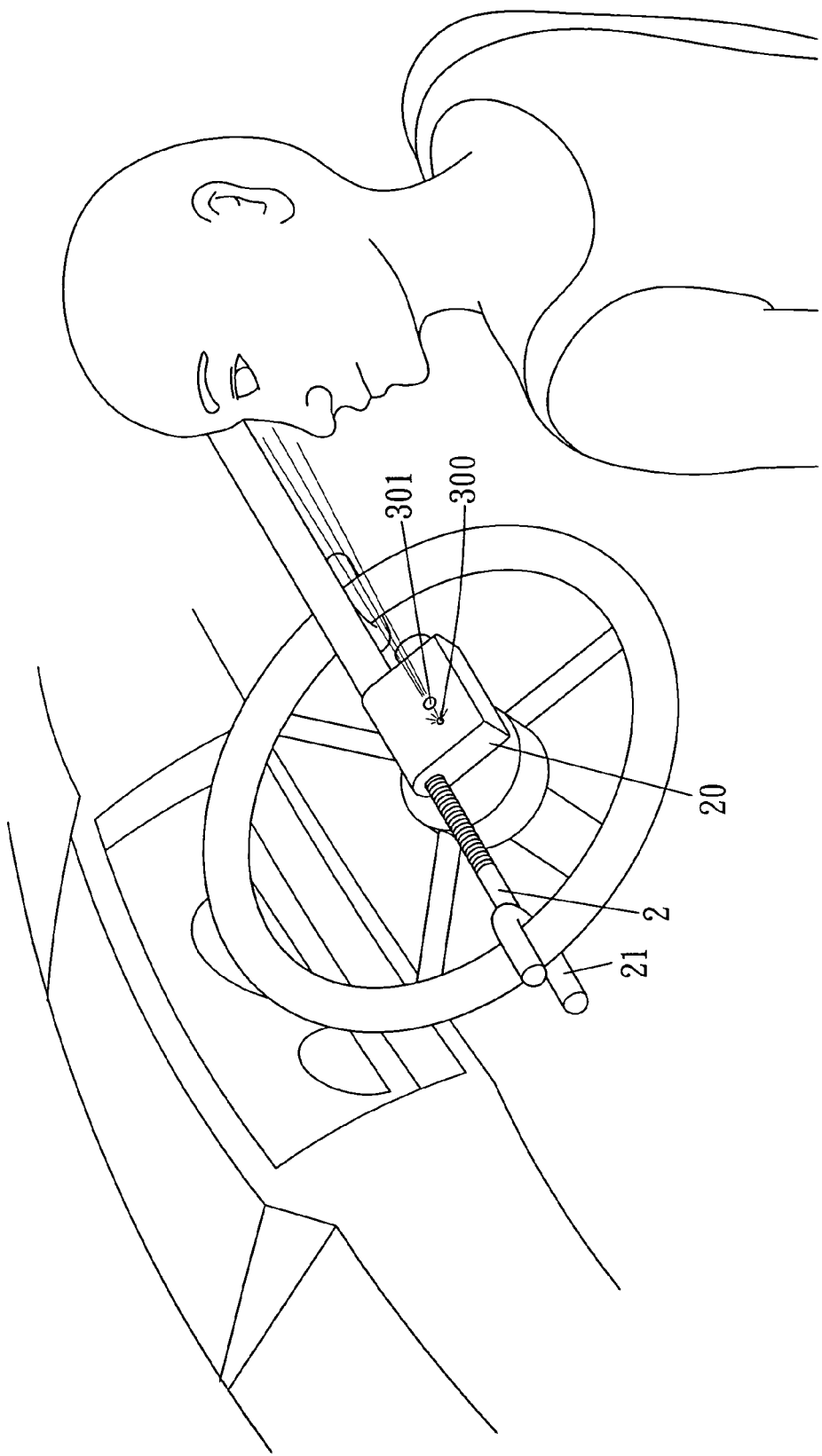
FIG. 4 is a perspective view of the preferred embodiment of an automobile anti-theft steering wheel lock with an alarm in the present invention, showing it being locked on a steering wheel.
Figure 5:
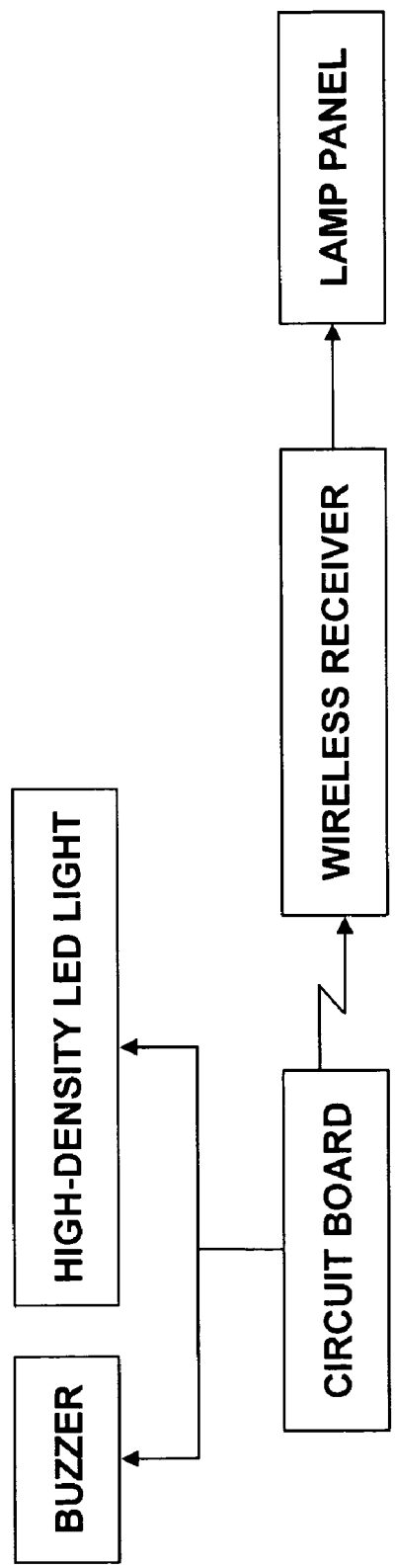
FIG. 5 is a flow chart showing how the alarm and the help signaling device function to make versatile warnings.
Figure 6:
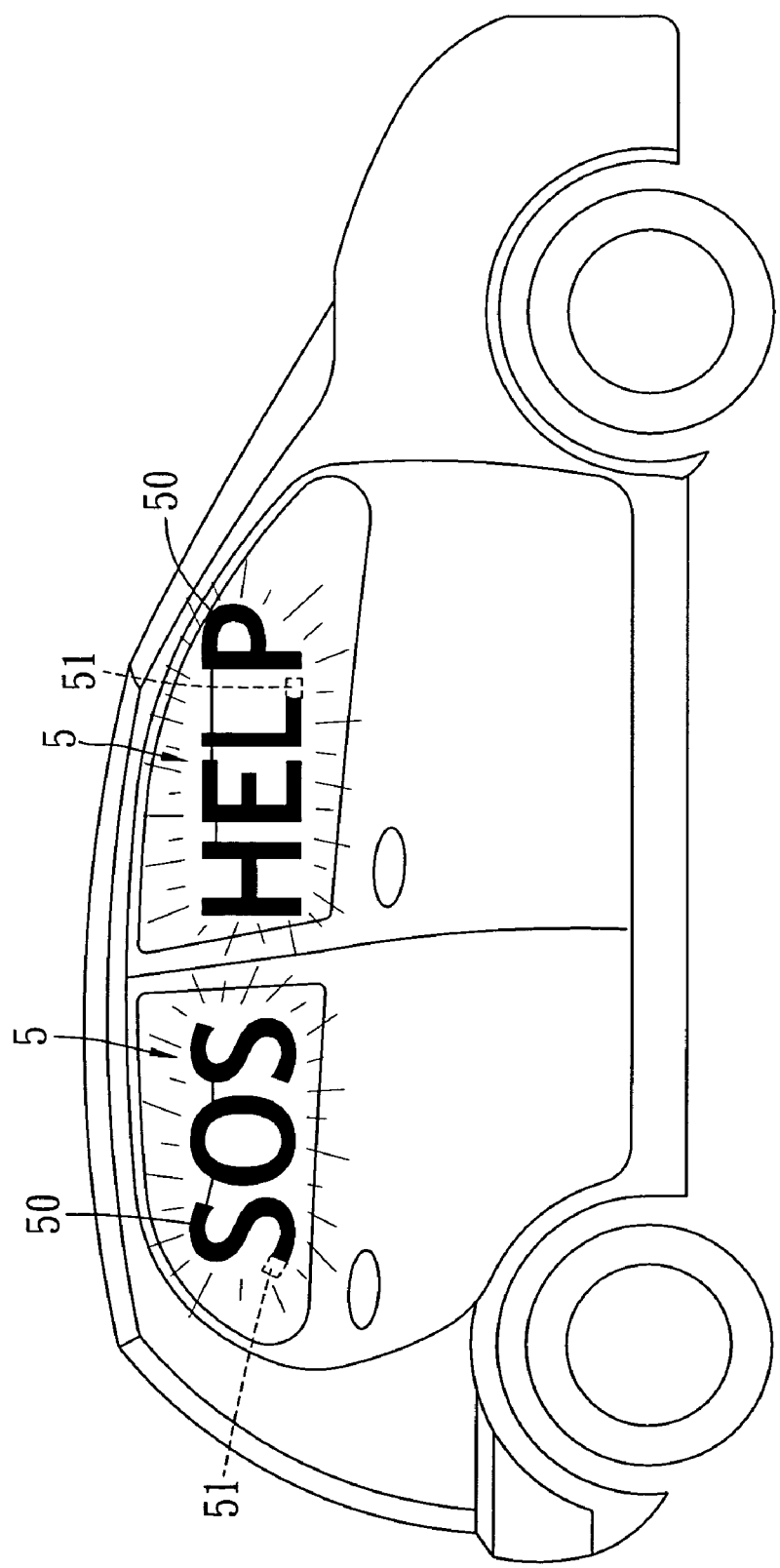
FIG. 6 is a front view of the help-signaling device of the preferred embodiment of an automobile anti-theft steering wheel lock with an alarm in the present invention, showing it is signaling.

In using, as shown in FIGS. 4~6, keep the hook 21 of the steering wheel lock 2 fitted with the steering wheel and insert a key into the keyway 204 to turn around for pushing the locking bar 203 to contact with the touch switch 33 so as to start the alarm 3, enabling the warning light 300 lit or flashing. In case that a burglar should try to enter a car, the alarm 3 could perceive a vibration of the car so that the buzzer 32 might sound loudly to frighten the burglar, spontaneously initiating the high-density LED light 301 lit to force the burglar suddenly shrink his pupils to feel uncomfortably and become blind temporarily, not only to delay burglar's action but to warn the car is broken. Moreover, the circuit board 30 of the alarm 3 is also to send a signal to the wireless receiver 51 of the help-signaling device 5, so as to keep the lamp panel 50 lit to show help characters. Therefore, by means of helping signals, sound of the buzzer and high-density light, the invention can achieve multiple anti-theft effects.

While the preferred embodiment of the invention has been described above, it will be recognized and understood that various modifications may be made therein and the appended claims are intended to cover all such modifications that may fall within the spirit and scope of the invention.

What is claimed is:

1. An automobile steering wheel lock with an alarm comprising:

an automobile anti-theft steering lock with the alarm including the steering wheel lock (2), the alarm (3), a cover (4) and a help-signaling device (5); wherein the steering wheel lock (2) is provided with a lock core (20) and two hooks (21) for hooking with a steering wheel; one hook (21) having an approximate Y shape and another hook (21) having an approximate U shape attached to a straight rod; the lock core (20) is composed of a chamber (200), at least one light hole (202) penetrating through a wall of the chamber (200), a locking bar (203) installed in a side section and a keyway (204) opened at one end of the locking bar (203);

the alarm (3) is installed in the chamber (200) of the lock core (20), and is provided with a circuit board (30), a battery (31) connected with the circuit board (30), a buzzer (32) and a touch switch (33) planted on the circuit board (30); the circuit board (30) capable of sending signals consists of a warning light (300) and a high-density LED light (301) both extending through the light holes (202) of the chamber (200) and keeping their tails slightly exposed out of the light holes (202);

the cover (4) is sealed on the lock core (20) of the steering wheel lock (2), provided with plural buzzing holes (40) corresponding to the buzzer (32) of the alarm (3);

the help-signaling device (5) installed at a conspicuous location of a car is provided with at least one lamp panel (50); each lamp panel (50) is formed of electro luminescent lamps or LED lamps in characters and provided with a wireless receiver (51) for receiving wireless signals sent by the alarm (3); and wherein in assembly, the alarm (3) is first installed in the chamber (200) of the lock core (20) of the steering wheel lock (2), keeping the warning light (300) and the high-density LED light (301) of the alarm (3) facing exactly to the light holes (202); put the lamp panels (50) of the help-signaling device (5) at windows or car body surface.

2. The automobile anti-theft steering wheel lock with an alarm as claimed in claim 1, wherein said chamber of said lock core is provided with screw holes.

3. The automobile anti-theft steering wheel lock with an alarm as claimed in claim 1, wherein said alarm is provided with screw holes for screws to pass through to fasten in said chamber.

4. The automobile anti-theft steering wheel lock with an alarm as claimed in claim 1, wherein said cover is provided with screw holes for screws to pass through to fasten in said lock core.

5. The automobile anti-theft steering wheel lock with an alarm as claimed in claim 1, wherein each said lamp panel of said help-signaling device is formed of electro luminescent lamps.

6. The automobile anti-theft steering wheel lock with an alarm as claimed in claim 1, wherein each said lamp panel of said help-signaling device is formed of LED lamps.

* * * * *